(12) United States Patent
Ellis et al.

(10) Patent No.: US 7,371,177 B2
(45) Date of Patent: May 13, 2008

(54) MULTIPLY INTERCONNECTABLE ENVIRONMENTALLY INTERACTIVE CHARACTER SIMULATION MODULE METHOD AND SYSTEM

(76) Inventors: Anthony Mark Ellis, South View Road, Crowborough, East Sussex TN6 1HW (GB); Andrew J. Riggs, 1105 Brittany Pl., Lewisville, TX (US) 75077

( * ) Notice: Subject to any disclaimer, the term of this patent is extended or adjusted under 35 U.S.C. 154(b) by 109 days.

(21) Appl. No.: 11/216,674

(22) Filed: Oct. 25, 2005

(65) Prior Publication Data
US 2006/0154711 A1 Jul. 13, 2006

Related U.S. Application Data

(60) Provisional application No. 60/642,565, filed on Jan. 10, 2005.

(51) Int. Cl.
- A63F 13/00 (2006.01)
- G06G 7/48 (2006.01)
- G06T 13/00 (2006.01)
- A63H 33/00 (2006.01)
- A63H 30/00 (2006.01)

(52) U.S. Cl. ............ 463/42; 463/30; 463/36; 463/37; 463/40; 703/11; 345/473; 446/69; 446/175

(58) Field of Classification Search ............ 463/1, 463/30–37, 46–47; 703/11; 446/69, 175; 706/58
See application file for complete search history.

(56) References Cited

U.S. PATENT DOCUMENTS

| | | |
|---|---|---|
| 4,233,778 A | 11/1980 | Lemelson |
| 5,445,552 A | 8/1995 | Hine |
| 5,467,102 A * | 11/1995 | Kuno et al. ............ 345/1.3 |

(Continued)

FOREIGN PATENT DOCUMENTS

EP    1 078 666 A    2/2001

(Continued)

OTHER PUBLICATIONS

Kawakami, Naoki, and Susumu Tachi, "Proposal for the Object Oriented Display: The Design and Implementation of the MEDIA 3", from Proceedings of the 7th International Conference on Artificial Reality and Tele-Existence, pp. 57-62, ICAT, Dec. 1997.*

(Continued)

Primary Examiner—John M. Hotaling, II
Assistant Examiner—Steven J. Hylinski
(74) Attorney, Agent, or Firm—Bell, Boyd & Lloyd LLP

(57) ABSTRACT

A simulated character module and method of operation are presented. The simulated character module includes a processor, a display operably coupled to the processor and a communication device operably coupled to the processor. The processor is configured to control a simulated character, and an image associated with the simulated character is displayable on the display. Further, the image is displayable on a second display of a second module to simulate movement of the simulated character to the second module. The module communicates with the second module using the communication device. Further, the image is not displayed on the display of the module if the image is displayed on the second display of the second module.

30 Claims, 15 Drawing Sheets

U.S. PATENT DOCUMENTS

| | | | |
|---|---|---|---|
| 5,956,046 A * | 9/1999 | Kehlet et al. | 345/502 |
| 5,966,526 A * | 10/1999 | Yokoi | 703/11 |
| 5,971,855 A | 10/1999 | Ng | |
| 5,986,622 A * | 11/1999 | Ong | 345/1.1 |
| 6,165,068 A * | 12/2000 | Sonoda et al. | 463/8 |
| 6,213,871 B1 * | 4/2001 | Yokoi | 463/7 |
| 6,227,931 B1 | 5/2001 | Shackelford | |
| 6,227,966 B1 * | 5/2001 | Yokoi | 463/1 |
| 6,297,785 B1 * | 10/2001 | Sommer et al. | 345/1.1 |
| 6,306,039 B1 * | 10/2001 | Kaji et al. | 463/42 |
| 6,327,482 B1 * | 12/2001 | Miyashita | 455/566 |
| 6,443,796 B1 | 9/2002 | Shackelford | |
| 6,535,907 B1 | 3/2003 | Hachiya et al. | |
| 6,540,606 B1 | 4/2003 | Matsukata | |
| 6,540,614 B1 * | 4/2003 | Nishino et al. | 463/40 |
| 6,560,511 B1 | 5/2003 | Yokoo et al. | |
| 6,565,413 B2 | 5/2003 | Brownrigg | |
| 6,569,018 B2 * | 5/2003 | Jaffe | 463/30 |
| 6,628,244 B1 * | 9/2003 | Hirosawa et al. | 345/2.3 |
| 6,652,383 B1 | 11/2003 | Sonoda | |
| 6,682,392 B2 | 1/2004 | Chan | |
| 6,687,128 B2 | 2/2004 | Tokuhara | |
| 6,752,680 B1 | 6/2004 | Hansen | |
| 6,795,318 B2 * | 9/2004 | Haas et al. | 361/729 |
| 6,819,304 B2 * | 11/2004 | Branson | 345/1.3 |
| 6,931,656 B1 | 8/2005 | Eshelman et al. | |
| 6,970,145 B1 * | 11/2005 | Aoki | 345/1.2 |
| 7,008,324 B1 * | 3/2006 | Johnson et al. | 463/42 |
| 7,089,083 B2 | 8/2006 | Yokoo et al. | |
| 7,170,468 B2 * | 1/2007 | Knopf | 345/1.3 |
| 7,184,718 B2 * | 2/2007 | Newman et al. | 455/90.3 |
| 7,196,676 B2 * | 3/2007 | Nakamura et al. | 345/1.1 |
| 7,242,369 B2 * | 7/2007 | Huang | 345/1.1 |
| 2002/0107075 A1 * | 8/2002 | Stephan | 463/46 |
| 2003/0027634 A1 | 2/2003 | Matthews | |
| 2004/0204126 A1 * | 10/2004 | Reyes et al. | 455/566 |
| 2005/0083642 A1 * | 4/2005 | Senpuku et al. | 361/681 |
| 2006/0001593 A1 * | 1/2006 | Baudisch | 345/1.1 |
| 2006/0160588 A1 | 7/2006 | Yamada et al. | |

FOREIGN PATENT DOCUMENTS

| | | |
|---|---|---|
| EP | 1078666 A2 * | 2/2001 |
| JP | 8137417 | 5/1996 |

OTHER PUBLICATIONS

Kawakami, Naoki,, Masahiki Inami, Dairoku Sekiguchi, Yasuyuki Yanagida, Taro Maeda, and Susumu Tachi, "Object-Oriented Displays: A New Type of Display Systems —From Immersive Display to Object-Oriented Displays", from Systems, Man, and Cybernetics, 1999, IEEE SMC '99 Conference.*

Inami, Masahiko, Tachi Laboratory, MEIP Faculty of Engineering, University of Tokyo, "Media 3: The Virtual Hologram", International Conference on Computer Grapphics and Interactive Tecniques, ACM SIGGRAPH 97 Visual Proceedings: The Art and Interdiciplinary Programs of SIGGRAPH '97.*

"Tamagotchi Connection Instruction Manual", from http://mimitchi.com/tamaplus/manual.shtml, copyright Bandai 2004.

* cited by examiner

MULTIPLY INTERCONNECTABLE ENVIRONMENTALLY INTERACTIVE CHARACTER SIMULATION MODULE METHOD AND SYSTEM

This application claims the benefit of U.S. Provisional Application Ser. No. 60/642,565, filed Jan. 10, 2005, the entire contents of which are incorporated herein by reference.

FIELD

The present invention relates to portable electronic character simulations. More specifically, the present invention relates to a portable electronic character simulation module that interconnects with one or more other portable electronic character simulation modules. The image associated with a character simulation can move between any interconnected modules and can interact with the character simulations of any interconnected modules. Further, the portable electronic character simulation module can include orientation, sound, light, time and/or other sensors.

BACKGROUND

Portable electronic units that house character simulations, for example virtual pets, gained popularity in about the last ten years, particularly with school-aged children. Typically, a virtual pet is a hand-held electronic device having a display (e.g., dot matrix LCD) and one or more buttons. An image representing a character simulation (e.g., a fanciful/alien creature, a dog, a cat, etc.) is shown on the display, and a user can interact with the character simulation via the buttons.

In one virtual pet, interaction with a user influences the development and health of the character simulation. For example, a user can be able to feed the character by pressing a feed button. If the user does not feed the character for a certain length of time, the image displayed for the character can change to indicate the character is hungry or in declining health. If left unfed long enough, a simulated character can even die. Conversely, if the user feeds the character too often, the character can become fat, fail to develop to a next stage or assume a less desirable form in a next stage. Similarly, the user can be able to tend to sanitary, playtime, discipline, medical and other needs of the simulated character.

While hand-held character simulations remain popular, users desire greater interactivity. In particular, there is a need for a hand-held character simulation that has greater interactivity with the user and the user's environment. Further there is a need for a hand-held character simulation that has greater interactivity with other hand-help character simulations.

SUMMARY

In one embodiment of the present invention, a simulated character module includes a processor, a display operably coupled to the processor and a communication device operably coupled to the processor. The processor is configured to control a simulated character, and an image associated with the simulated character is displayable on the display. Further, the image is displayable on a second display of a second module to simulate movement of the simulated character to the second module. The module communicates with the second module using the communication device.

Further, the image is not displayed on the display of the module if the image is displayed on the second display of the second module.

In another embodiment, the image is displayable on a third display of a third module to simulate movement of the simulated character to the third module. The third module is connected to the module indirectly.

In one embodiment, the simulated character module includes an orientation sensor. In another embodiment, the simulated character module includes a sound sensor. In still another embodiment, the simulated character module includes a light sensor. In yet another embodiment, the simulated character module includes a time device.

In another embodiment, a character is simulated, a representation of the character is displayed on a display of a simulated character module, the simulated character module is operably connected with a second simulated character module, and movement of the character to the second simulated character module is simulated. The movement simulation includes displaying the representation of the character on the display of the second simulated character module.

In another embodiment, movement of the character to a third simulated character module is simulated. This simulation includes displaying the representation of the character on a third display of the third simulated character module. The third simulated character module is connected to the simulated character module indirectly.

In one embodiment, simulating the character includes receiving input from an orientation sensor. In another embodiment, simulating the character includes receiving input from a sound sensor. In still another embodiment, simulating the character includes receiving input from a light sensor. In yet another embodiment, simulating the character includes receiving input from a time device.

Additional features and advantages of the present invention are described in, and will be apparent from, the following Detailed Description of the Invention and the figures.

DETAILED DESCRIPTION

In one embodiment of the present invention, a character simulation module is interconnectable with one or more other character simulation modules. Preferably, the module is directly interconnectable with up to four other character modules and indirectly interconnectable with an unlimited number of other modules, but the limit for directly and indirectly interconnected modules can be any suitable number.

Figure 1A:
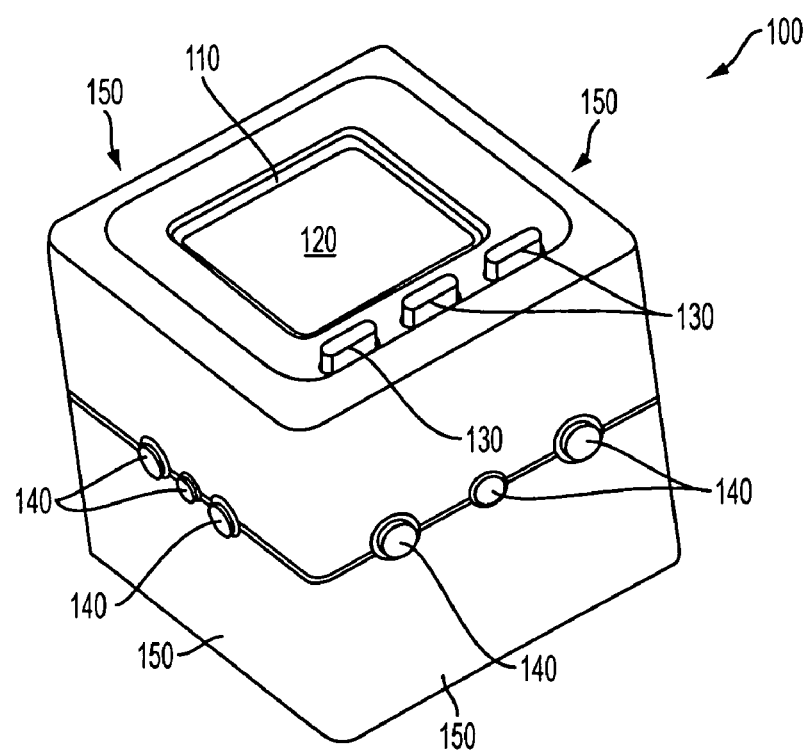
FIGS. 1A and 1B illustrate simulated character modules in accordance with one embodiment of the present invention.
Figure 1B:
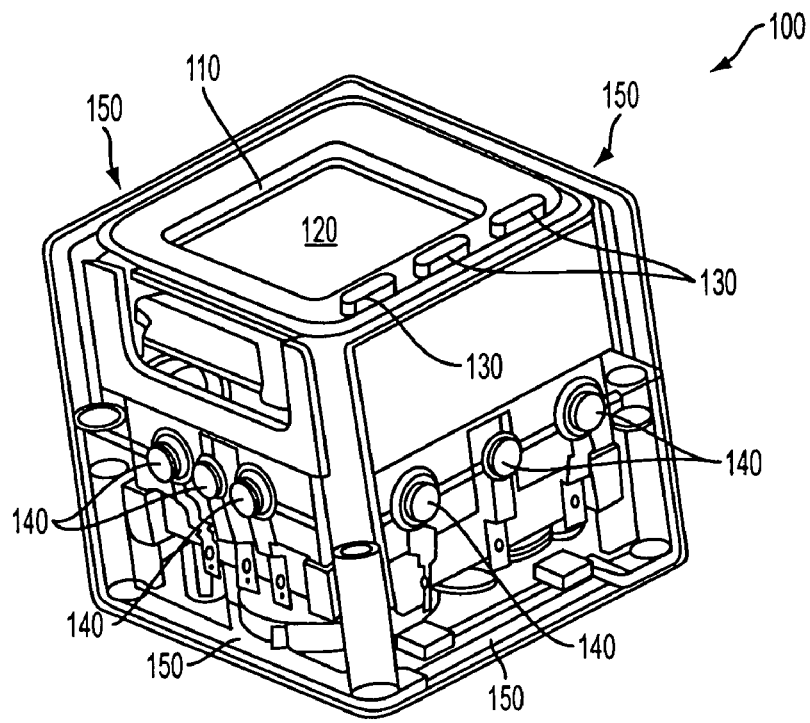

As illustrated by FIGS. 1A and 1B, the character simulation module 100 is preferably substantially cube-shaped; however, the module can be any suitable shape. Further, the module 100 is preferably suitably sized to be hand-held (e.g., 40 mm×40 mm×40 mm, or 47 mm×47 mm×47 mm), but can be any suitable size. At least one surface 110 (e.g., a front surface) of the module 100 includes a display 120. The display 120 is preferably a 32×32 pixel dot matrix liquid crystal display (LCD) approximately 25 mm×25 mm in size, but the display 120 can be of any suitable type, resolution and size. Further, the module 100 has input devices 130 that enable a user to interact with the module 100.

Communication devices 140 are located on one or more surfaces 150 (e.g., a top, left, right and bottom surface) that enable the module 100 to interconnect with other modules. Preferably, the communication devices 140 and the display 120 are not on the same surface; however, communication devices 140 can be positioned on the same surface as the display 120. When another module is interconnected with the module 100, communication devices 140 preferably form a physical connection with the communication devices of the other module. Communication devices 140 are preferably flat metal connectors, but can be either male or female connectors which both connect two modules and help hold those modules in an interconnected position. Alternatively, communication devices 140 can communicate wirelessly (e.g., via IR, RF, other light or sonic transmissions), and can be located on the interior of the module 100 rather than at any surface.

Figure 2:
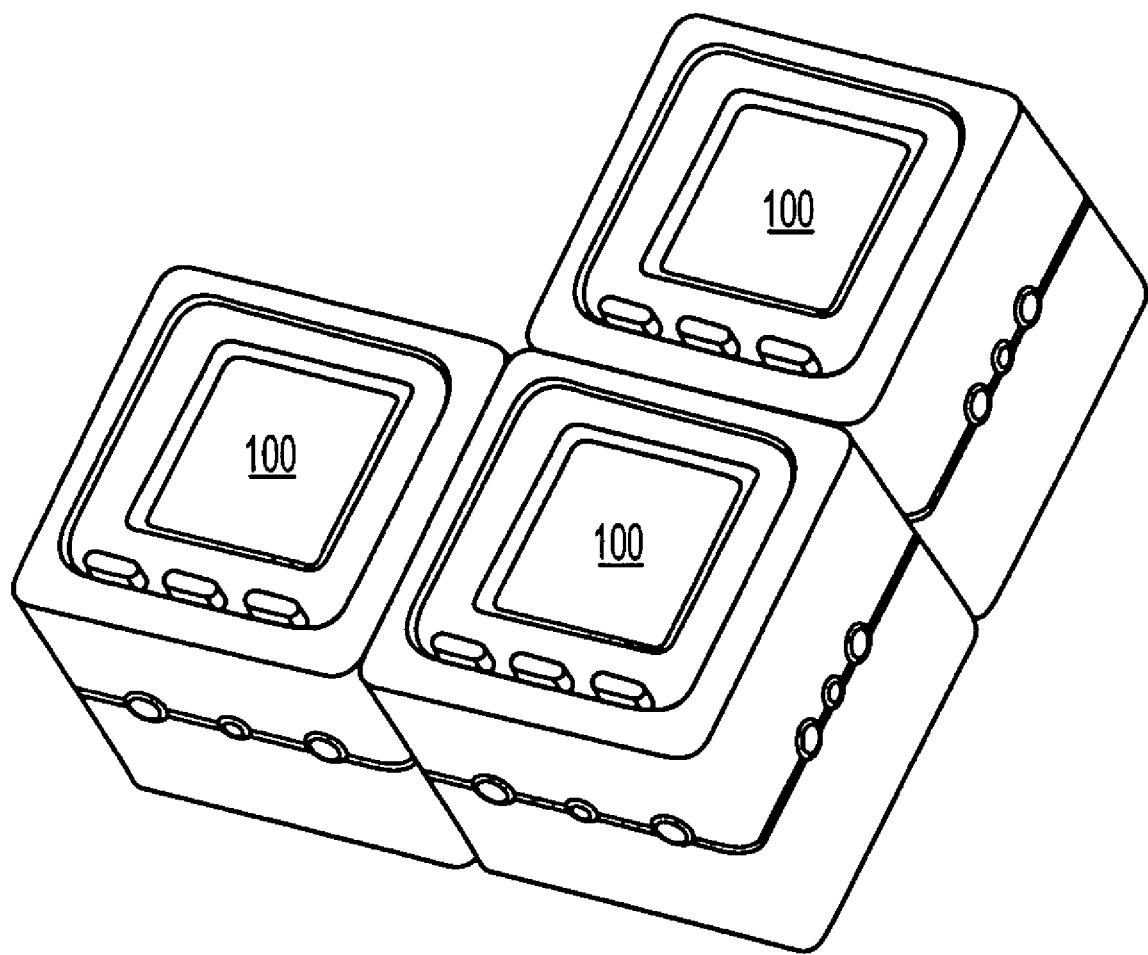
FIG. 2 illustrates three interconnected simulated character modules in accordance with one embodiment of the present invention.
Figure 3:
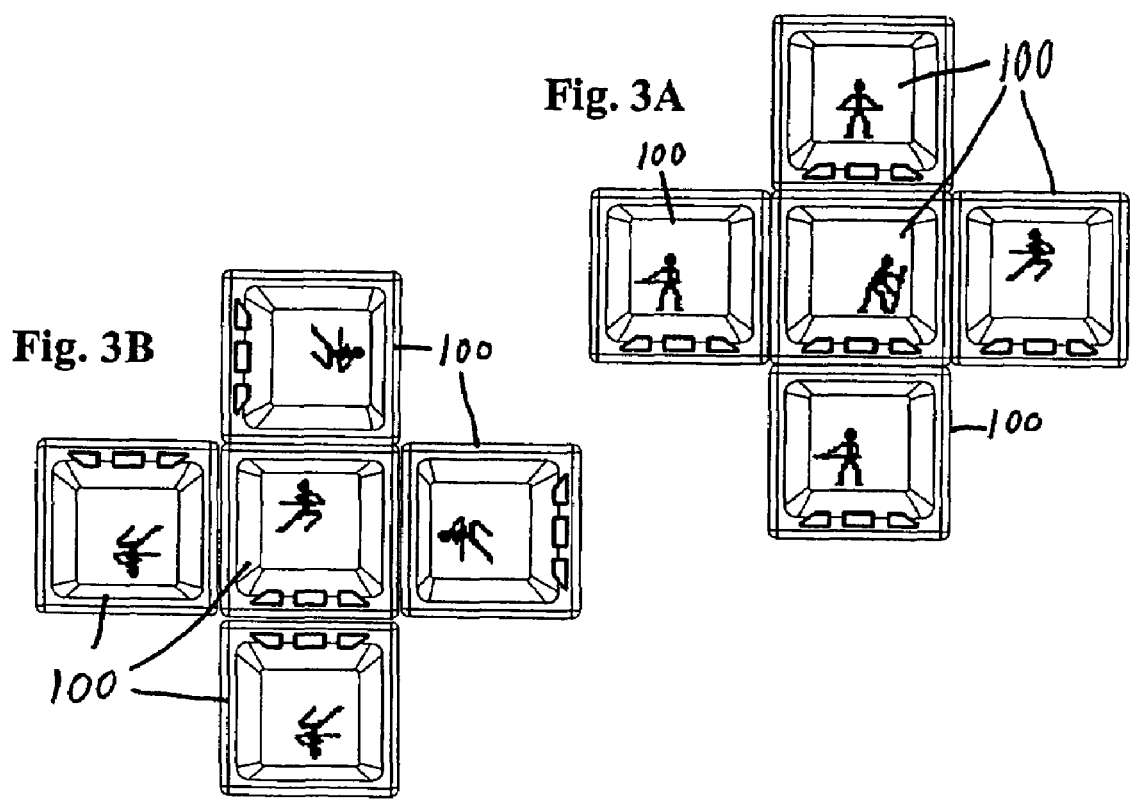
FIGS. 3A and 3B illustrate a collection of simulated character modules that can only be connected in certain configurations being connected in both a correct and incorrect manner in accordance with one embodiment of the present invention.

As shown in FIG. 2, modules 100 can be interconnected. Preferably, modules can only be connected in certain configurations. For example, a top side of one module can be connectable only to a bottom side of another module and not any other side of that module. FIGS. 3A and 3B show examples of correct and incorrect, respectively, module 100 interconnection when modules 100 are only connectable in certain configurations. In FIG. 3A, each of the illustrated interconnection configurations is permitted. In contrast, in FIG. 3B, none of the interconnections configurations illustrated are permitted.

Alternatively, modules can be interconnected in any configuration, if desired. For example, any side of one module can be connected to any side of another module. Further, modules are preferably secured in place when interconnected by magnets; however modules can be secured in any other suitable manner, or modules can be unsecured and free to move relative to each other.

One or more, possibly all, input devices 130 are preferably disabled or ignored when the module 100 is interconnected with another module; however, input devices 130 can remain active and continue to provide a user with the ability to provide the module 100 and/or other interconnected modules with input. The housing 160 can have any suitable color, decoration or design. Preferably, the housing 160 appearance for a particular module is created through injected plastic colors, paint or pad print; however, the appearance can be created through any other suitable manner. Further, the housing 160 is preferably substantially opaque as shown in FIG. 1A; however, the housing 160 can be translucent as shown in FIG. 1B or transparent, if desired.

Figure 4:
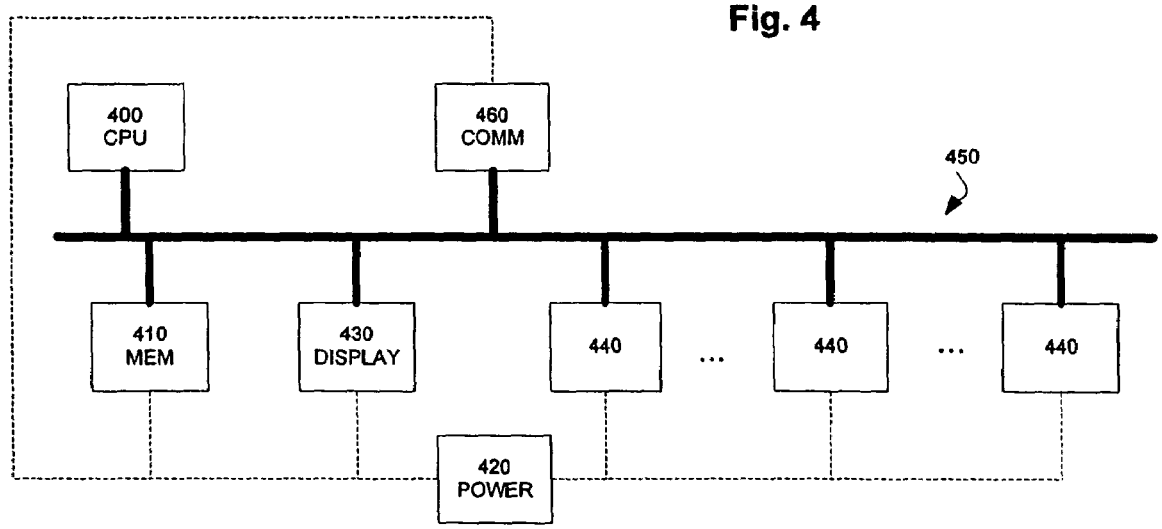
FIG. 4 illustrates a schematic block diagram of the electronic configuration of the simulated character module of FIG. 1.

As illustrated in FIG. 4, a character simulation module (e.g., module 100) also includes a processor 400, memory unit 410, power source 420, display 430, one or more input devices 440 and one or more communication devices 450. The processor 400, memory unit 410, display 430, input devices 440 and communication devices are connected by a bus 450, but these components can be connected in any suitable manner (e.g., each component being directly connected to the processor). The processor 400 and memory unit 410 are separate, but the memory unit 410 can alternatively be included as part of the processor 400. Similarly, power source 420 supplies power directly to each component, but power can be provided from the power source 420 to the other components in any suitable manner. Further, power source 420 is preferably a battery, but can be a DC or AC connection to a standard household power line or automobile cigarette lighter slot or any other suitable source of electric power.

Processor 400 and memory unit 410 control and store a simulated character. One or more images associated with the simulated character can be shown on display 430. Preferably, display 430 is a virtual window into the simulated character's world. The behavior of the simulated character can be influenced by signals from the input devices 440 and/or the communication devices 460.

Figure 5A:
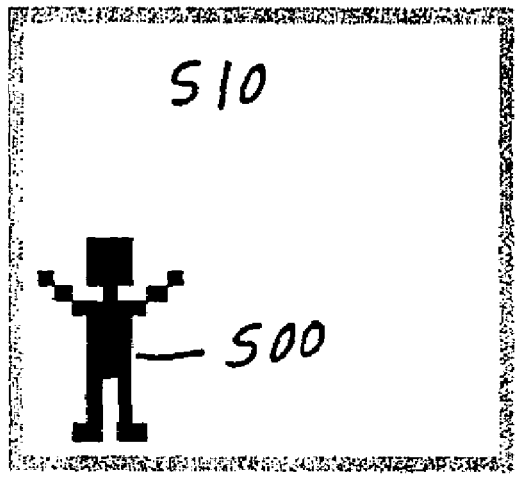
FIGS. 5A-E illustrate images for simulated characters in accordance with one embodiment of the present invention.
Figure 5B:
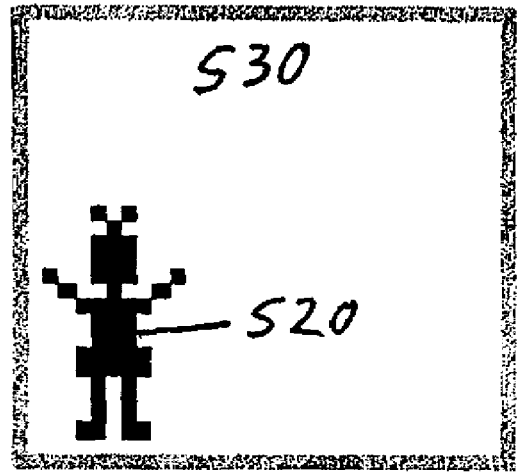
Figure 5C:
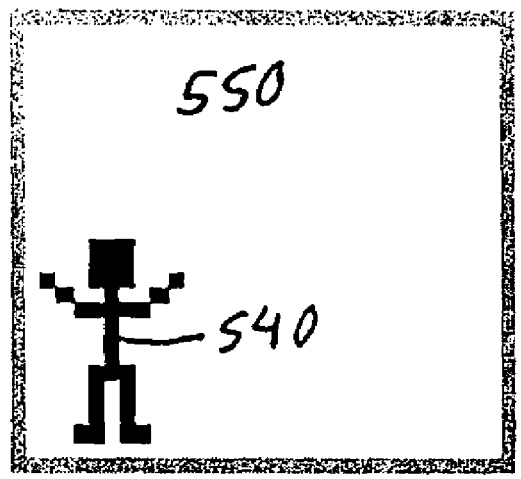
Figure 5E:
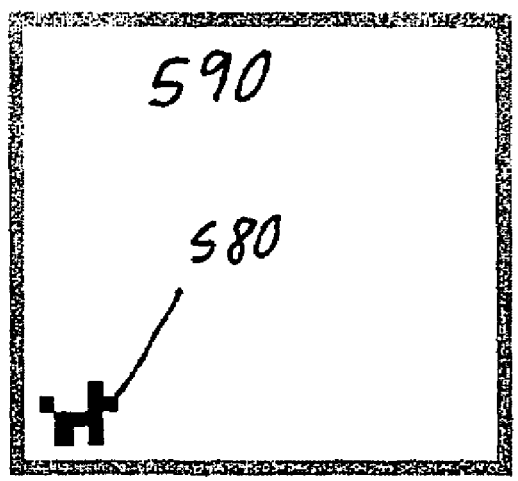
Figure 5D:
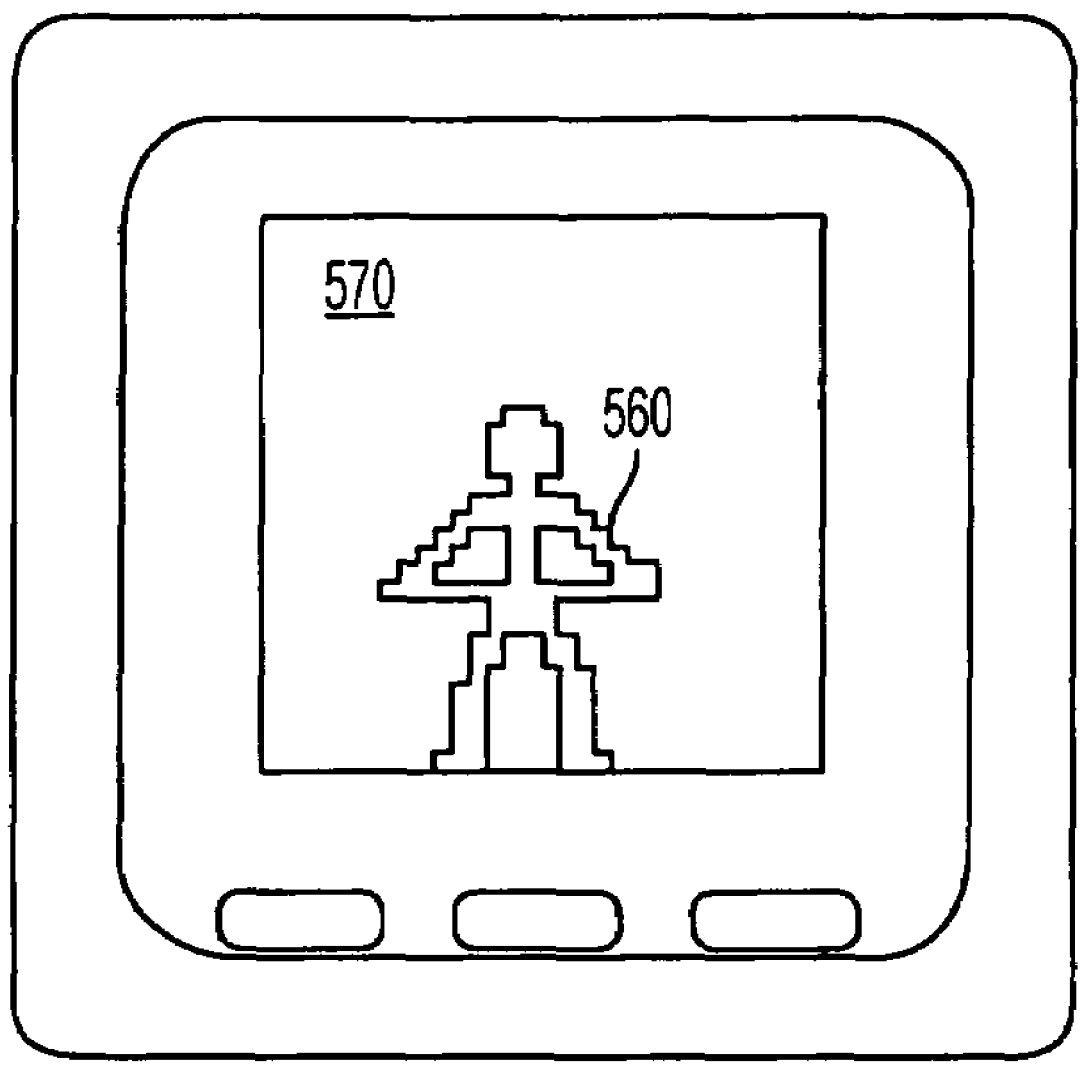

Different simulated character modules can contain simulated characters that differ in their visual representation, behavior, or other characteristics. As a result, simulated characters can be distinguished by their associated images or by their animated behavior. As illustrated by FIGS. 5A-B, simulated characters can have genders. An image 500 resembling the general shape of a man is shown on display 510 of FIG. 5A, and an image 520 resembling the general shape of a woman wearing a dress and having a bow in her hair is shown on display 530 of FIG. 5B. Alternatively, simulated characters, such as the one represented by the stick figure image 540 shown on display 550 of FIG. 5C, or the one represented by the stick figure image 560 carrying a cane, staff or stick shown on display 570 of FIG. 5D can be genderless. Further, as illustrated by FIG. 5E, a simulated character can be an animal, such as the image 580 resembling a dog shown on display 590.

Two similar, or even identical, appearing simulated characters can be distinguished by animations of their behavior. For example, one character hops around and another walks on its hands. Further distinguishing characteristics include, but are not limited to, dancing a disco move, turning a cartwheel, doing a back flip, performing a somersault, flexing muscles, passing gas, belching, dancing with a cane, wearing a top hat, carrying a sword, shooting an arrow, firing a gun, using a lasso, winking, blowing a kiss, changing size, flying, swinging, having a beard, having long hair, having a Mohawk, having a moustache, wearing a skirt, being some kind of animal, being a plant and reading a book.

Simulated Character Mobility Between Modules

As FIGS. 6A-I illustrate, a simulated character image 600 can leave one simulated character module and enter another. Thus, the virtual world of the character is expanded to include the interconnected modules. The image 600 associated with a character simulation can move between any interconnected modules. The identifying characteristics of the simulated character typically enable a viewer to track the image 600 as it moves from module to module. However, in some circumstances, the display of one or more modules can be cluttered, thus hampering the ability to track the image 600 for a particular simulated character.

Figure 6A:
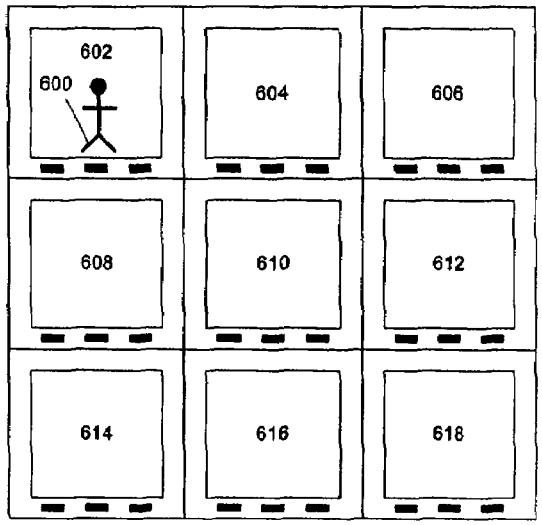
FIGS. 6A-I illustrate a simulated character as it moves from module to module in accordance with one embodiment of the present invention.
Figure 6B:
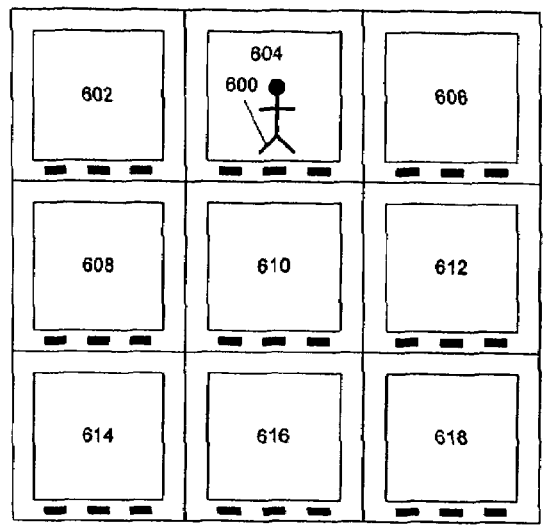

Simulated character modules 602, 604, 606, 608, 610, 612, 614, 616 and 618 are interconnected in a square pattern, similar to an apartment complex, but can be arranged in any suitable configuration. Initially, for the sake of example, the character simulation associated with character image 600 is maintained in simulated character module 610 and the image is displayed in FIG. 6E on simulated character module 610. The image 600 can move to any of the interconnected modules. If the simulated character climbs, jumps, tunnels, teleports or otherwise goes through the ceiling of module 610, the image 600 is displayed in module 604, as illustrated in FIG. 6B.

Figure 6C:
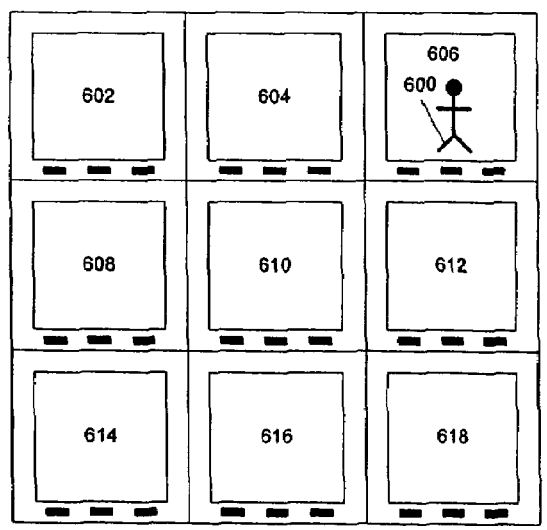
Figure 6D:
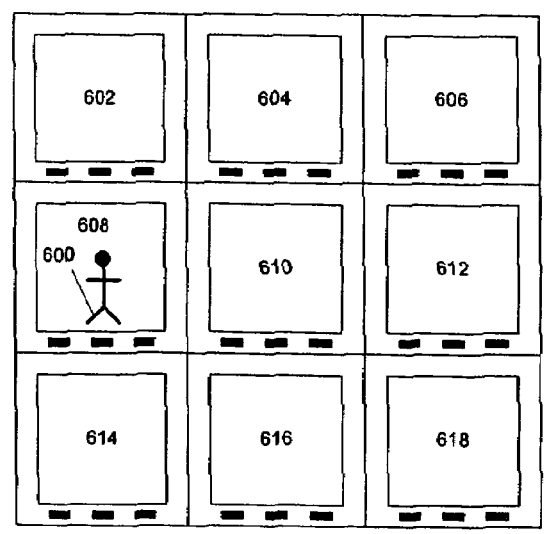
Figure 6E:
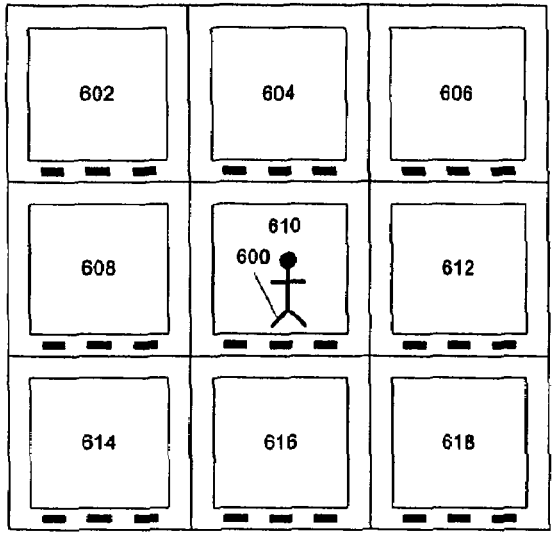
Figure 6F:
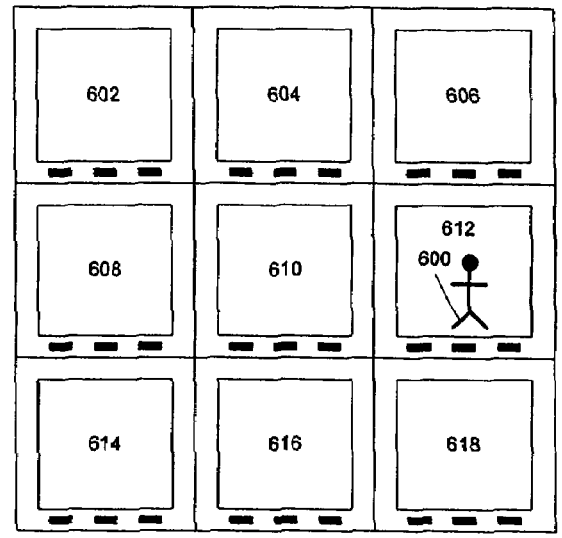

Similarly, if the simulated character walks, hops, runs, jumps, tunnels, teleports or otherwise goes through the left wall of module 610, the image 600 is displayed in module 608, as illustrated in FIG. 6D. If the simulated character instead goes through the right wall or the floor, the image is displayed in module 612 as in FIG. 6F or module 616 as in FIG. 6H, respectively. Preferably, the image 600 can move directly between any two modules that are directly interconnected. However, some circumstance (e.g., the rules of a game or a particular module) could prevent the image 600 from moving directly between two directly interconnected modules.

Figure 6G:
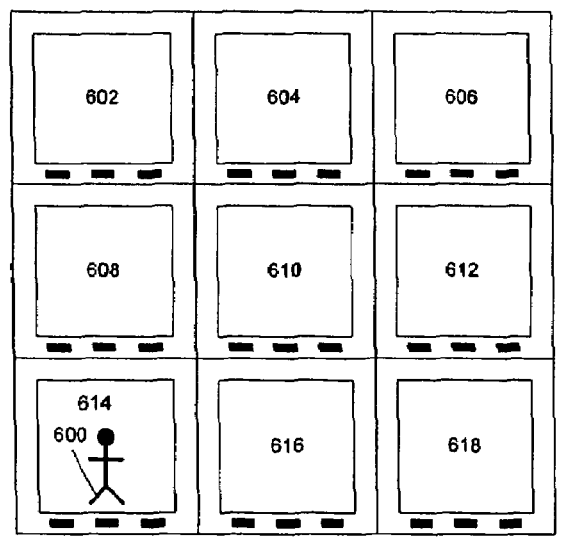
Figure 6H:
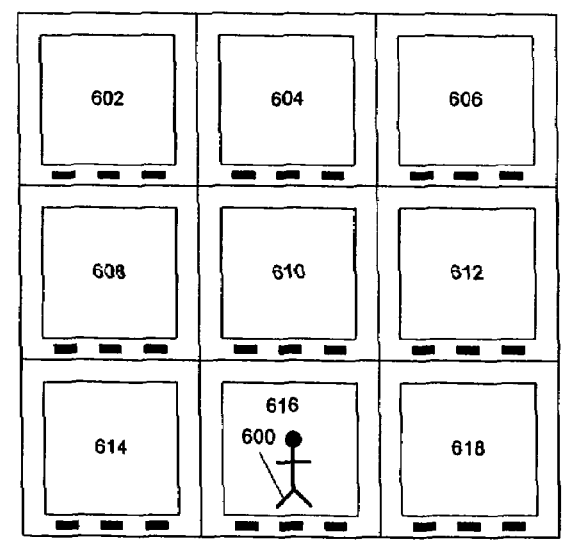
Figure 6I:
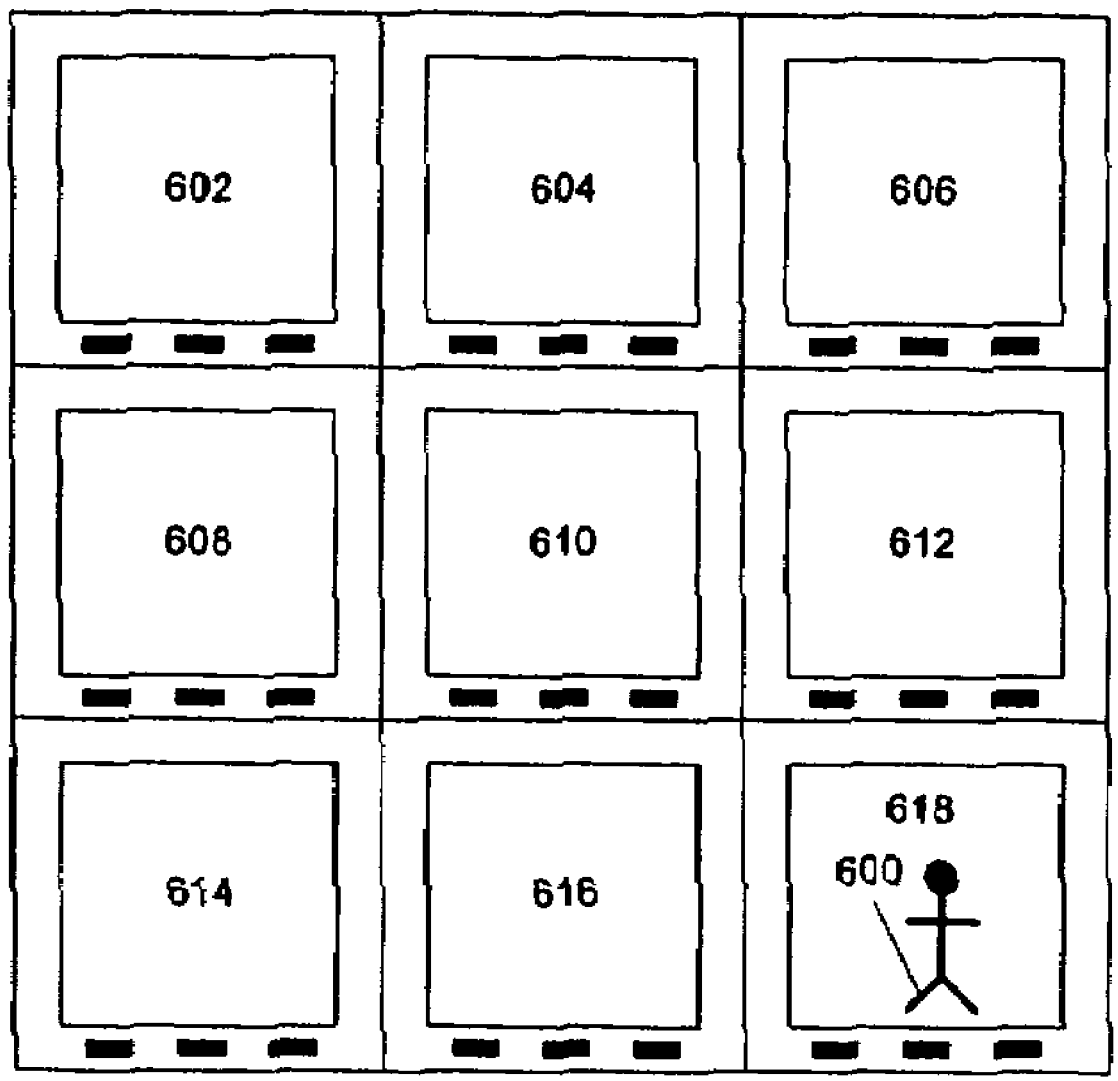

Preferably, the image 600 cannot move directly to a module connected only indirectly to the module currently displaying the image 600. For example, image 600 could not move directly to module 602. Instead, to reach module 602 as illustrated in FIG. 6A, the image 600 must first pass through either module 604 or 608. Likewise, the image 600 must move from either module 604 or module 612 to reach module 606, as illustrated in FIG. 6C. Similarly, if the image 600 is in module 616, it could move to module 614 or module 618, as illustrated in FIGS. 6G and 6I, respectively.

Figure 7:
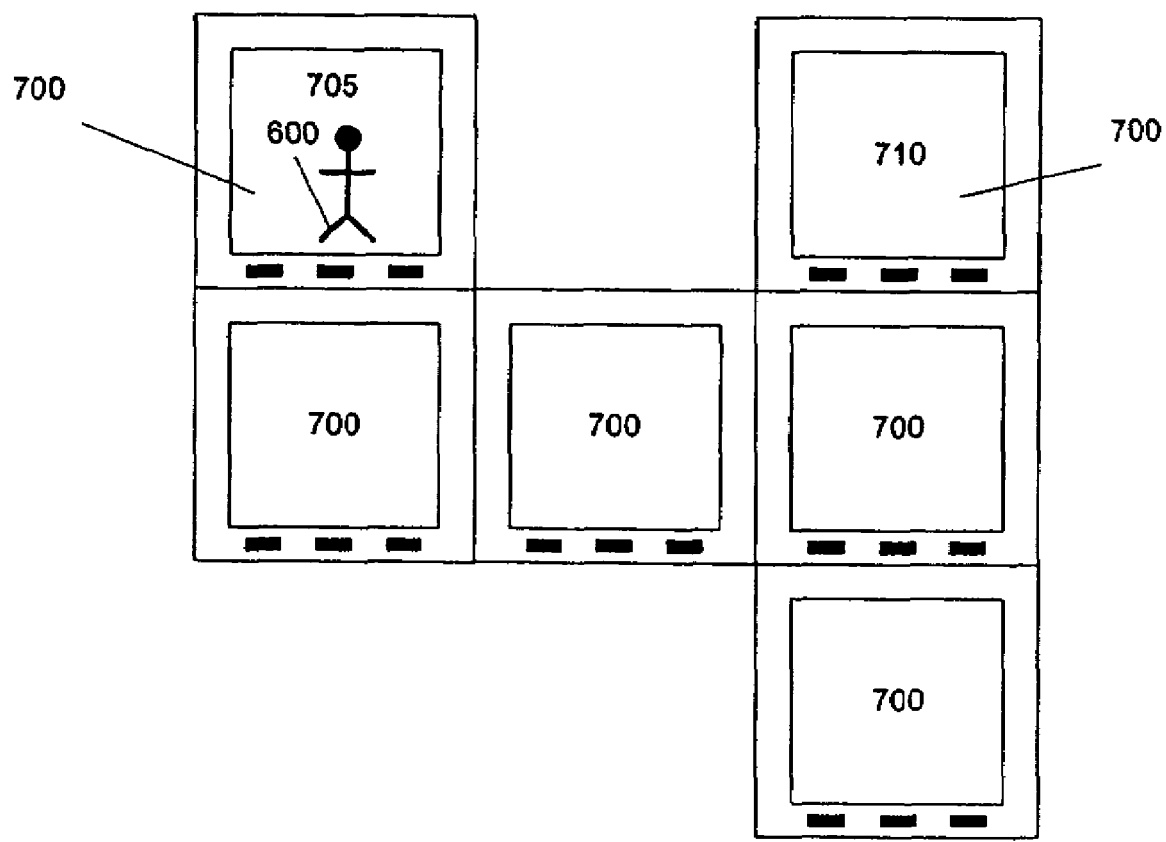
FIG. 7 illustrates a possible configuration for interconnected modules in accordance with one embodiment of the present invention.

Alternatively, the image 600 is able to move directly to module 602 from module 610 even though the two modules are only connected indirectly. Image 600 could move directly between two indirectly connected modules that are even further apart (e.g., the modules do not share a side or even a corner). For example, in the alternative configuration of modules 700 illustrated in FIG. 7, the image 600 could move directly from module 705 to module 710. In such an event, preferably an amount of time would pass between the image 600 leaving module 705 and appearing on module 710. Preferably, the amount of time is approximately equal to the amount of time it would typically take the image 600 to move through the empty space 715 if it were filled by one or more modules 700. However, the amount of time can be any length or there can be no delay at all. Further, if the image 600 teleports from module 705 to module 710, the amount of time can be substantially the same as passes when the image 600 teleports between any other two modules.

Preferably, when a character's image moves between modules, information for the character remains in the memory of the original module. Further, the character continues to be controlled by the processor of the original module. The module to which the character's image has moved transmits information about itself (e.g., other simulated objects displayed by the module, properties or rules of the module, etc.) to the module controlling the character. That module's processor determines the character's next action and transmits the information to the module displaying the character. The information can be transmitted directly to that module's display or to the displaying module's processor.

Alternatively, when a character's image moves to a new module, information for the character is transmitted to the new module's memory and the new module's processor takes over control of the character's actions. Preferably, a copy of the character's information is permanently stored on the original module, and in the event that the original module is separated from the module containing the character, the character can be reinitialized in the original module. Preferably, the character will continue to exist in the non-original module until some event (e.g., a power failure) causes the character to cease to exist; however, the character can cease to exist as a direct result of its original module being separated from the module it is in.

Alternatively, the original module can delete the character from memory and not retain a permanent copy. As a result, in the event that the initial module is separated from the character, the character cannot be reinitiated in the original module.

Orientation Sensor

Figures 8A, 8B, 8C, 8D:
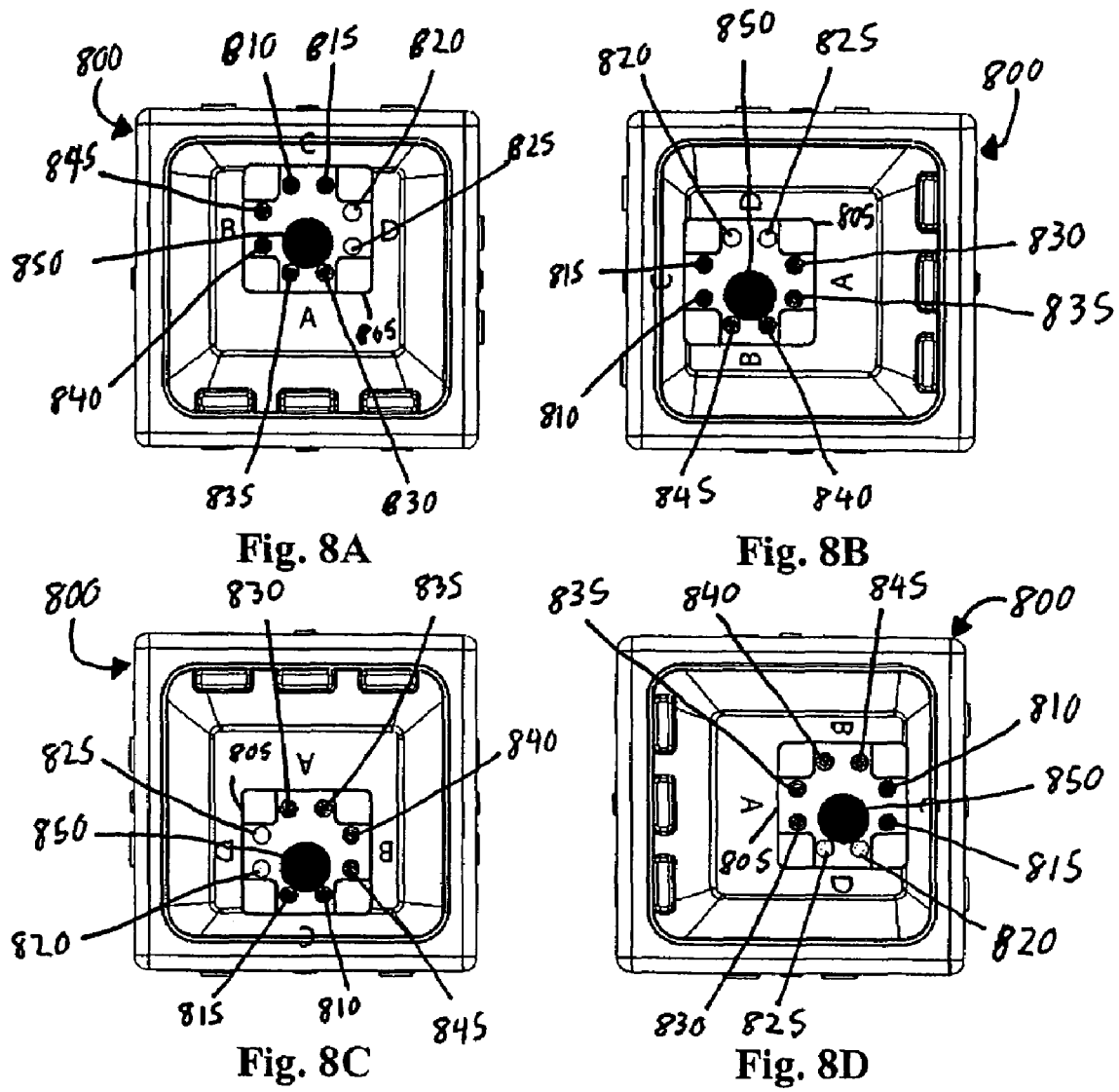
FIGS. 8A-D illustrate a simulated character module and its orientation sensor in different orientations in accordance with one embodiment of the present invention.

As illustrated by FIGS. 8A-D, a character simulation module 800 is preferably, but not necessarily, equipped with an orientation sensor 805. The orientation sensor 800 includes electrical connectors 810, 815, 820, 825, 830, 835, 840 and 845, as well as a mobile, electrically conductive member 850. Eight is the preferred number of connectors, but any suitable number of connectors greater than or equal to two can be present. When the character simulation module 800 is resting as illustrated in FIG. 8A, gravity causes the electrically conductive member 850 to contact electrical connectors 830 and 835, enabling a signal to pass between the two connectors. Thus, the orientation sensor 805 detects its orientation.

If the module 800 and orientation sensor 805 are rotated ninety degrees counter-clockwise, as illustrated in FIG. 8B, gravity causes the electrically conductive member 850 to contact electrical connectors 840 and 845, enabling a signal to pass between the two connectors. Similarly, if the module 800 and orientation sensor 805 are again rotated ninety degrees counter-clockwise, as illustrated in FIG. 8C, the electrically conductive member 850 is again moved by gravity and now contacts electrical connectors 810 and 815, enabling a signal to pass between the two connectors. Another ninety degree counter-clockwise rotation places the module 800 and orientation sensor 805 in the position illustrated by FIG. 8D. The electrically conductive member 850 contacts electrical connectors 820 and 825, enabling a signal to pass between the two connectors.

The electrically conductive member 850 is preferably a metal disk or sphere, but any suitable material (e.g., a conductive liquid such as mercury) can be used. Further, the electrically conductive member 850 preferably only contacts two electrical connectors at a time at most. Alternatively, the electrically conductive member 830 can contact, and thus electrically couple, more than two electrical connectors at one time.

The orientation sensor 805 enables the simulated character to react to changes, or the lack thereof, in the orientation of the module 800. For example, if the module 800 is tilted to the left, an animation showing the simulated character falling to the left and then standing up again is displayed. Similarly, if the module 800 is tilted to the right, an animation showing the simulated character clinging to the left side of the display to prevent slipping to the right is shown. Further, sequences of changes in the module's 800 orientation can trigger different animations. For example, rotating the module three hundred sixty degrees causes an animation of the simulated character acting dizzy to be shown. It should be noted that orientation sensor 805, having eight electrical connectors, can be capable of distinguishing different orientation categories, the four substantially similar to those illustrated and four additional orientations substantially similar to orientations reached by rotating any of the illustrated orientations forty-five degrees. Other orientation sensors can resolve orientation to different resolutions.

In addition to, or instead of, triggering an animation, orientation changes or sequences of orientation changes can trigger games, change properties of the simulated world, disable one or more input devices, cause input from one or more input devices to be ignored, turn off a module display, or initiate any other suitable reaction. Further, the reaction triggered by a sequence of one or more orientation changes can vary depending on the state of the module, the simulated world, the number of interconnected modules, the configuration of the interconnected modules and/or any other suitable condition. It should be noted that different characters can react differently to identical conditions.

Sound Sensor

Preferably, a simulated character module has a sound sensor that provides the processor with audio input from the module's environment; however a sound sensor is not necessary to a module. The sound sensor enables a simulated character to react to noises. For example, if music is playing (e.g., from a radio, a stereo system, a computer, a musical instrument, finger tapping on a table, etc.), the character begins to dance, preferably in sync with the music; however, a character can dance without being in sync with the music.

In addition to, or instead of, causing a character to dance, audio input (e.g., a spoken word, a clapping sound, a whistle, a tone, etc.) can trigger games, change properties of the simulated world, disable one or more input devices, cause input from one or more input devices to be ignored, turn off a module display, or initiate any other suitable reaction. Further, the reaction triggered by an audio input can vary depending on the state of the module, the simulated world, the number of interconnected modules, the configuration of the interconnected modules and/or any other suitable condition. It should be noted that different characters can react differently to identical conditions.

Figure 9:
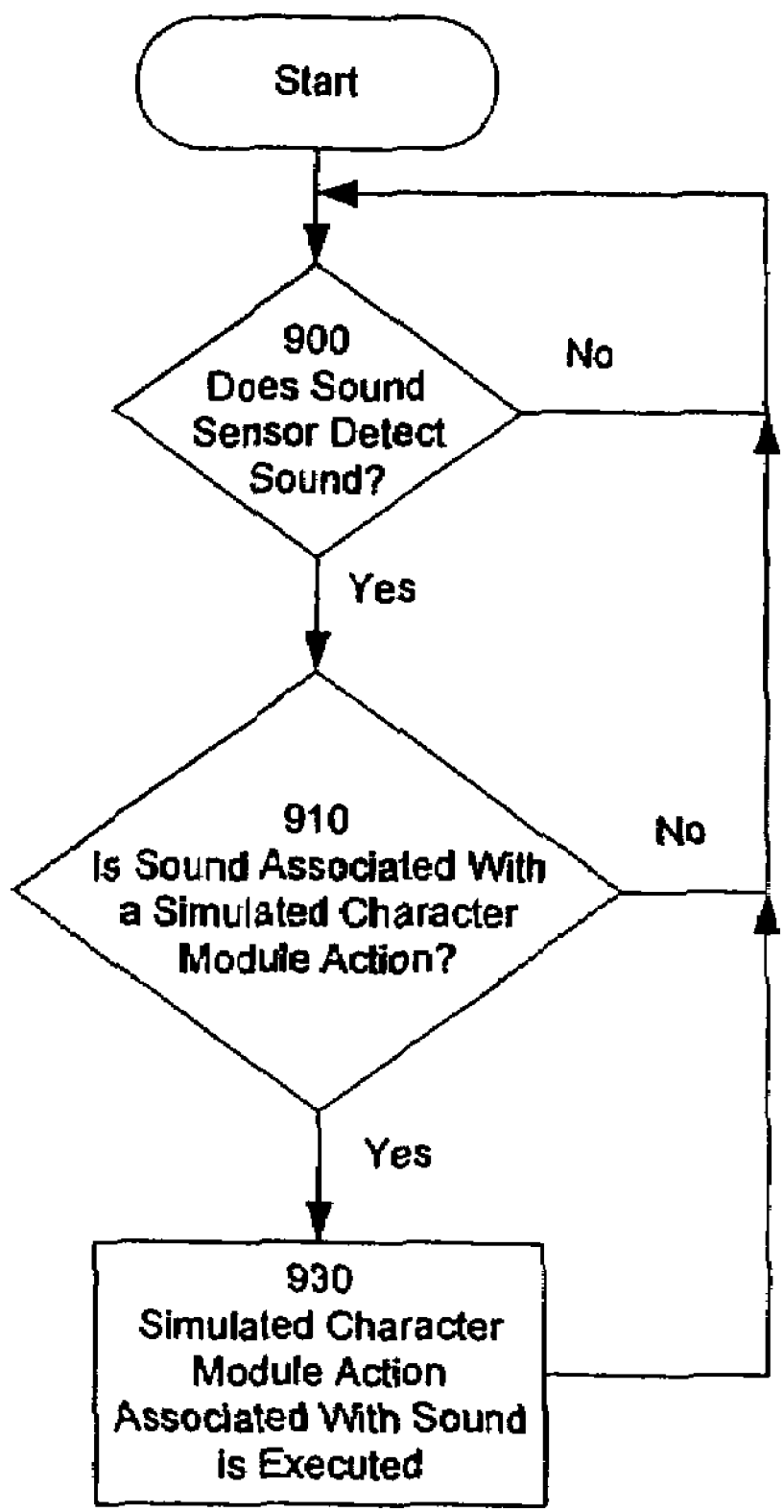
FIG. 9 is a flow diagram of the process of operating a simulated character module that has a sound sensor in accordance with one embodiment of the present invention.

FIG. 9 shows a process of operating a simulated character module that has a sound sensor. At step 900, it is determined whether the sound sensor detects a sound. If the sound sensor does not detect a sound, the process repeats at step 900. If the sound sensor detects a sound, at step 910, it is determined whether the sound is associated with a simulated character module action. Simulated character module actions include, but are not limited to, causing a character to exhibit a behavior, triggering a game, changing a property of the simulated world, disabling one or more input devices, causing input from one or more input devices to be ignored, turning off a module display or any other suitable reaction. If the sound is not associated with a simulated character module action, the process repeats at step 900. If the sound is associated with a simulated character module action, at step 920, the action is executed and the process repeats at step 900.

Preferably, a simulated character module has a sound generating device such as a piezo buzzer or a speaker; however, a module can have any other suitable sound generating device, any suitable vibration device or no sound generation capability. Preferably, a simulated character module can detect and react to one or more sounds made by another simulated character module.

Light Sensor

Similarly, a simulated character module preferably has a light generating device such as an LED, a flash bulb or a laser; however, a module can have any other suitable light generating device or no light generation capability. A simulated character module can preferably detect and react to light emitted by another simulated character module.

Preferably, a simulated character module has a light sensor that provides the processor with visual input from the module's environment; however a light sensor is not necessary to a module. Preferably, the light sensor detects the level of light and/or brightness in the module's environment; however, the light sensor can be more complex (e.g., a video camera) or any other suitable light detecting input device. The light sensor enables a simulated character to react to visual input from the environment. For example, if the light is bright (e.g., daytime or the room lights are on), the character becomes active and if the light is dim or off (e.g., nighttime or room lights are off), the character goes to sleep. It should be noted that the character can engage in any other suitable behavior as a result of the input provided by the light sensor. Further, different characters can react differently to identical conditions.

Further, input from the light sensor can trigger games, change properties of the simulated world, disable one or more input devices, cause input from one or more input devices to be ignored, turn off a module display, or initiate any other suitable reaction. Also, the reaction triggered by input from the light sensor can vary depending on the state of the module, the simulated world, the number of interconnected modules, the configuration of the interconnected modules and/or any other suitable condition.

Figure 10:
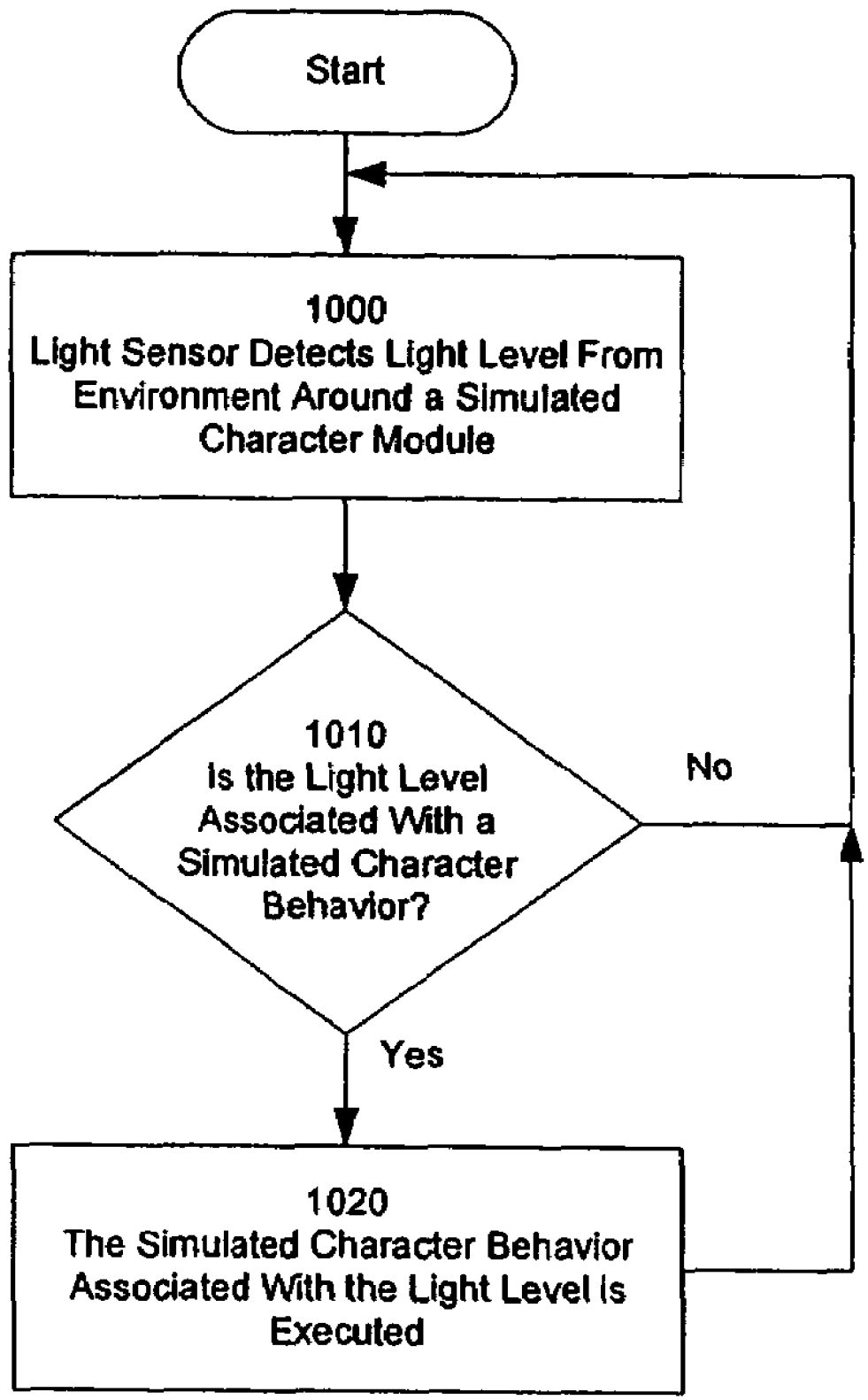
FIG. 10 is a flow diagram of the process of simulating a character that reacts to light levels in accordance with one embodiment of the present invention.

FIG. 10 shows a process of simulating a character that reacts to light levels. At step 1000, a light sensor detects a light level from the environment around a simulated character module. At step 1010, it is determined whether the light level is associated with a simulated character behavior. Simulated character behaviors include, but are not limited to, sleeping, playing, praying, dancing, eating, singing, working, mating, bathing, showering, grooming, dressing, flinching, shielding the character's eyes, changing a facial expression or any other suitable reaction. If the light level is not associated with a simulated character behavior, the process repeats at step 1000. If the light level is associated with a simulated character behavior, at step 1020, the behavior is executed and the process repeats at step 1000.

Preferably, simulated character module can also react to the rate of change and/or frequency of change of the light level. For example, if the light level increases rapidly (e.g., a light is turned on in a dark room containing the module), the module can cause a simulated character to rub its eyes or execute any other suitable reaction. Similarly, if the light level drops rapidly, the module can cause a simulated character to stumble around blindly or execute any other suitable reaction. If the light level fluctuates erratically (e.g., the only source of light is lightning flashes in a thunderstorm), the module can cause simulated rain to occur in the simulated world or execute any other suitable reaction. Similarly, if the light level fluctuates regularly (e.g., the source of light is a strobe light), the module can cause the simulated character to dance or execute any other suitable reaction.

Input from the light sensor can preferably be used together with other input sensors to produce more complex module and/or simulated character reactions; however, the light sensor can be used alone to produce any suitable module and/or simulated character reactions if desired. For example, if the light level suddenly increases when a time device of the module indicates that it is night time, the module can cause the simulated character to pull down a simulated shade or close simulated blinds on the display or execute any other suitable reaction. Similarly, other input devices can be used alone or together to produce any suitable module and/or simulated character reactions if desired.

Time Device

Preferably, a simulated character module has a time device or clock that provides the processor with chronological information; however a time device is not necessary to a module. Preferably, the time device is a standard clock that can be set and keeps track of the time and/or date; however, the time device can be more complex (e.g., a clock set by signals from the atomic clock) or any other suitable time device. The light sensor enables a simulated character to react to the time of day and/or time of year. For example, at night the character becomes socially active and in the day the character goes to work. Similarly, on July Fourth, the character can set off fireworks, or on New Year's Eve, the character can wear a lamp shade on its head and dance all night. It should be noted that the character can engage in any suitable behavior as a result of the time of day and/or time of year. Further, different characters can react differently to identical conditions.

Further, input from the time device can trigger games, change properties of the simulated world, disable one or more input devices, cause input from one or more input devices to be ignored, turn off a module display, or initiate any other suitable reaction. Also, the reaction triggered by input from the time device can vary depending on the state of the module, the simulated world, the number of interconnected modules, the configuration of the interconnected modules and/or any other suitable condition.

Figure 11:
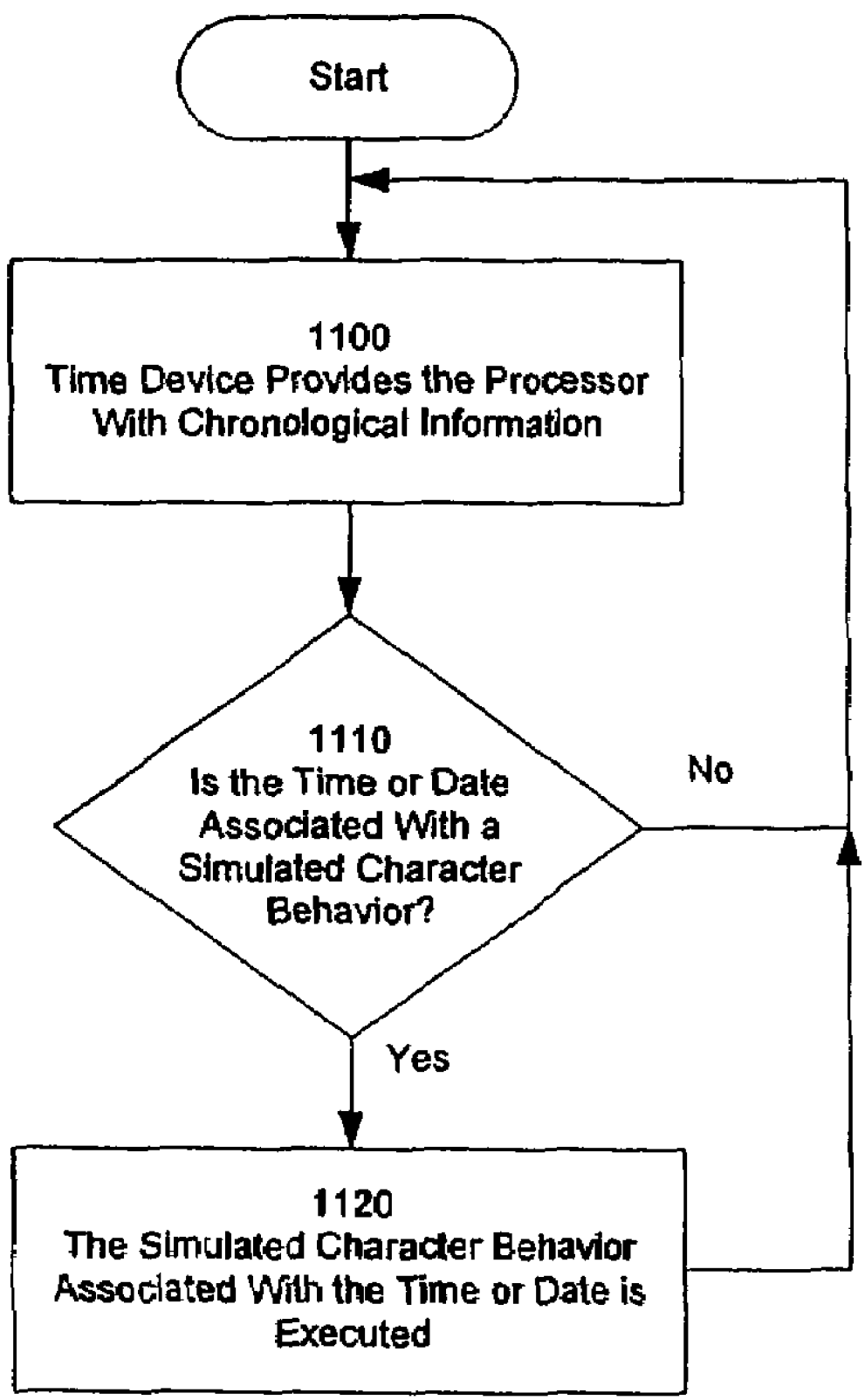
FIG. 11 is a flow diagram of the process of simulating a character that reacts has different behaviors depending upon the time or date in accordance with one embodiment of the present invention.

FIG. 11 shows a process of simulating a character that reacts has different behaviors depending upon the time or date. At step 1100, a time device provides the processor with chronological information. At step 1110, it is determined whether the time or date are associated with a simulated character behavior. Simulated character behaviors include, but are not limited to, sleeping, playing, praying, dancing, eating, singing, working, mating, bathing, showering, grooming, dressing, singing, drinking, setting off fireworks, waving a flag, wearing a lamp shade as a hat, wearing a costume, fasting, attending a religious service, marrying, playing an instrument and/or a song (e.g., taps), giving a gift, parading, grilling or any other suitable reaction. If neither the time nor the date is associated with a simulated character behavior, the process repeats at step 1100. If time or date is associated with a simulated character behavior, at step 1120, the behavior is executed and the process repeats at step 1100

Simulated Character Interaction

Preferably, two or more simulated characters from different interconnected modules are able to interact. For example, two characters can participate in a game, dance, fight, race, exchange information, engage in a competition, exchange virtual goods or services, become friends, date, give each other gifts, produce offspring, or engage in any other suitable interaction. The type of interaction is preferably influenced by characteristics of the simulated characters, configuration of the modules, characteristics of one or more modules, and/or environmental input; however, the type of interaction can be determined in any suitable manner.

Preferably, a user can control or influence the interaction by providing input to the modules. A user can provide input by using one or more buttons, making a sound, flashing a light, changing the modules' orientation, adding or removing modules, or any other suitable means of providing input to the modules. However, a user can also be unable to influence or control the interaction.

Game interactions can be any suitable type of game. For example, when two or more simulated character modules are connected, the simulated characters can play against each other in a game (e.g., checkers, chess, a race, card games, fighting games, or any other suitable game). Alternatively, the characters can be pieces in a game played by one or more users.

For example, users can connect, directly or indirectly, two modules, and the simulated characters of those modules can compete. Preferably, the losing character is transferred to the winning character's module, or some other module owned by the same player; however, the losing character can simply be deleted from its module and the winning player can be rewarded in another manner (e.g., by improving the competitive worth of the winning character) or any other suitable set of actions can execute. The module of the loser is preferably able to reinitiate a simulated character; however, the module can be unable to reinitiate a simulated character. Such a module would remain empty until another simulated character is transferred to it. The outcome of the competition between characters can be deterministic, but preferably there is a random or pseudorandom element to the outcome. The objective of such a game would be to amass a valuable collection of simulated characters.

In another game, each player can have more than one simulated character as a piece in the game. For example, the modules can be used to play a game similar to fantasy or other theme-based card games (e.g., Magic the Gathering, Illuminati, etc.). Preferably, players take turns adding one or more modules to the interconnected group. Game play is preferably influenced by the characters in the modules added, the location to which the modules are added, a random or pseudorandom number generator, input from the players (e.g., via buttons or other sensors) and/or input from the environment (e.g., orientation, sound, light, etc.). However, game play can be conducted in any suitable manner.

Figure 12:
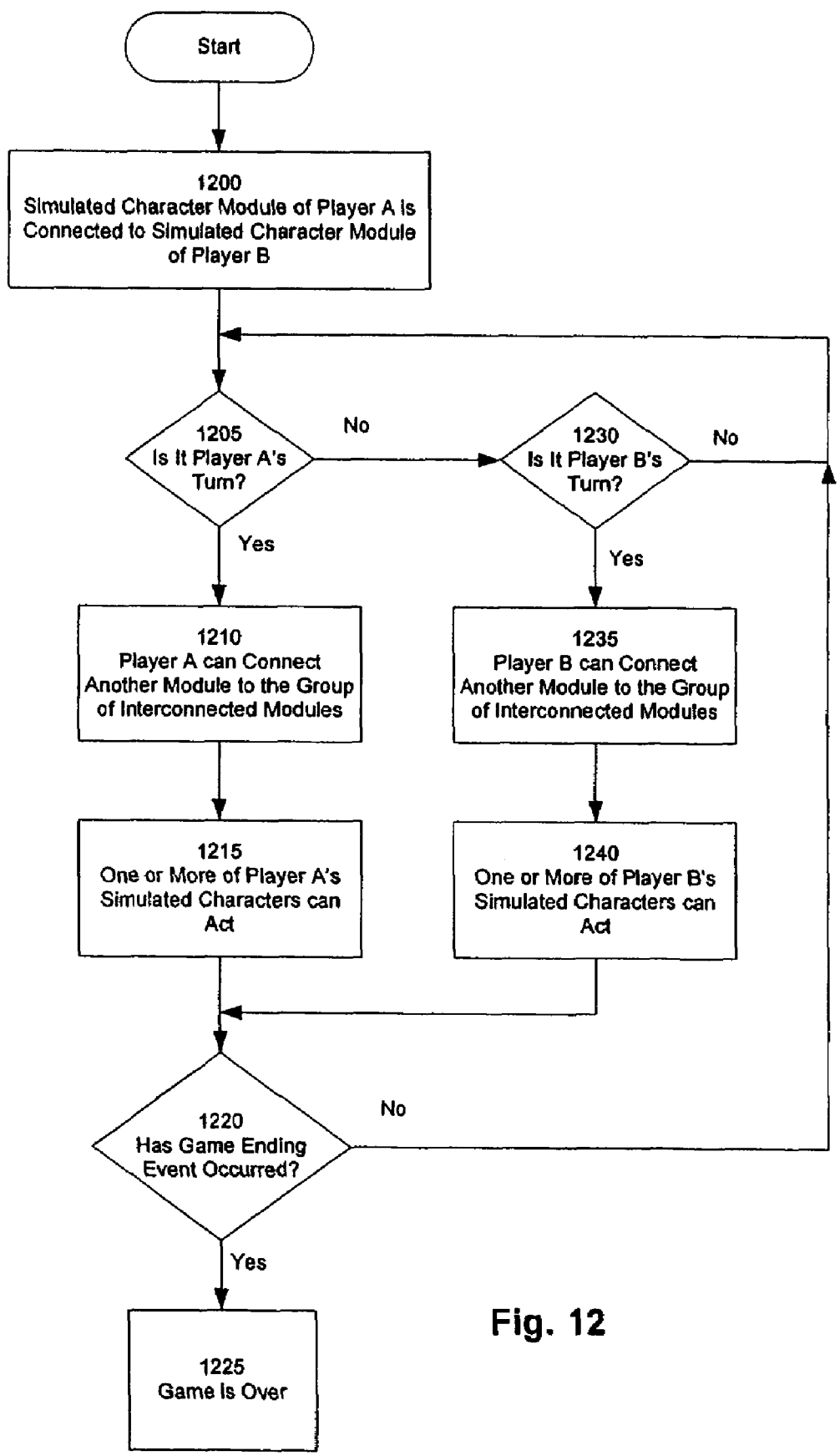
FIG. 12 is a flow diagram of the process for playing a game in which simulated characters are pieces of the game in accordance with one embodiment of the present invention.

FIG. 12 shows a process for playing a game in which simulated characters are pieces of the game in accordance with one embodiment of the present invention. The game is preferably a two player game, as illustrated; however, the game can have more than two players, if desired. At step 1200, a simulated character module of Player A is connected to a simulated character module of Player B. The modules are configured such that their connection initiates play of the game. Preferably, no other modules are connected to either the module of Player A or the module of Player B when they are connected; however, game play can be conducted such that one or more other modules are connected to one or both of the modules of Player A or Player B when the modules are connected.

Preferably, the game includes turns during which players can take actions; however, the game can include rounds, simultaneous play and/or any other suitable system for advancing game play. At step 1205, it is determined whether it is Player A's turn. If it is Player A's turn, at step 1210, Player A can connect another module to the group of interconnected modules. At step 1215, one or more of Player A's simulated characters can act. The simulated character actions can be directed by Player A (e.g., through instructions input through input devices on one or more modules; however, the simulated character actions can be determined by the configuration of the interconnected modules, by a random or pseudo-random event or in any other suitable manner. The actions can include attacking Player B's simulated characters, defenses or game points, building defenses for Player A, maneuvering, waiting, casting spells or any other suitable action. Preferably, some actions can result in the simulated character moving between modules and interacting with (e.g., fighting with or attacking) other characters.

At step 1220, it is determined whether a game ending event has occurred. If a game ending condition has occurred, at step 1225, the game is over. If not, the process repeats at step 1205.

If, at step 1205, it is determined that it is not Player A's turn, at step 1230, it is determined whether it is Player B's turn. If it is not Player B's turn, the process repeats at step 1205. If it is Player B's turn, at step 1235, Player B can connect another module to the group of interconnected modules. At step 1240, one or more of Player B's simulated characters can act and the process continues at step 1220. Preferably, once a module is connected to the group of interconnected modules, the module is not removed until game play ends; however, modules can be removed at any suitable time during game play if desired.

The game can also be a simulation. The user can connect two or more modules and simply observe the simulated characters actions and interactions in their simulated world, similar to watching interconnected ant farms or hamster habitats. Modules can be added to introduce new characters into the world and/or to provide new interaction options. For example, one module can enable characters in the simulated world to dance, another module can enable characters to reproduce, and other modules could give characters the ability to engage in other suitable interactions.

Simulated Character Generation

Preferably, a user can influence or control character attributes that are present when the character is created or generated; however, character attributes present at character generation can alternatively be uninfluenced by a user. Attributes present at character generation can include the way the character looks, communicates or acts in the simulated environment. Further, a character is preferably normally displayed in stick form, but when the character wants to communicate to the world outside of the simulated environment, it brings its head to the full screen. As a result, facial features, expressions or movements can be displayed in greater detail. Such facial features, expressions and movements can be attributes that a user can influence or control upon character generation. Further still, the simulated character can communicate with the real world (e.g., the user) via text. The text is preferably displayed in cartoon bubbles when the character brings its head to the full screen; however, the text can be presented in any suitable manner at any suitable time.

Preferably, the character that is generated as a result of the user influencing one or more character attributes (e.g., appearance, temperament, language, dialect, education level, etc) can move to other users' modules. The character can then cohabit in the host module and interact with the host module's characters. Preferably, the module includes a "clone" function which enables a user to keep his or her creation on one module and have one or more copies travel to other modules. Preferably, the amount of memory necessary to store a character is relatively small compared to the total available memory for a module. As a result, many simulated characters can coexist in the same module.

Preferably, a simulated character attributes generator enables efficient usage of the system uC volatile memory resources with regards to character generation and storage. Attributes are preferably formed in elements and built up into a character profile, similar to police "photo fit" systems. Character profiles can be generated in accordance with random and/or user input. Alternatively a character profile can be a default profile.

Preferably, one or more attributes are represented as memory addressed pixel patterns in the uC ROM; however, attributes can be represented in any suitable manner and in any suitable device. Further, characters are preferably treated as sprites, enabling simple internal code commands move them around the screen; however, characters can be displayed as any type of graphical representation and can be manipulated in any suitable manner.

Preferably, firmware forms a "Virtual World" generator engine, which has a number of interaction routine libraries available; however, the generator engine can be hardware or software and need not include any libraries, if desired. Preferably, the attributes of a particular character (e.g., character personality/behavior weights or values) further modify these routines, thereby providing changing play-patterns.

Generated characters can be stored in system registers/RAM, or preferably in flash memory, where they could survive a long term power-down; however, characters can be stored in any suitable storage device.

Character attributes can be any suitable variable or fixed size. As an example, each attribute can be an 8-bit element (1 byte). Using such attributes, an exemplary unique character can be stored using 5 bytes, though, it should be understood that unique characters could be stored using more or fewer bytes, depending upon the size and number of attributes. Byte 1 of the exemplary character represents hair style/head gear (e.g., hat) information. Byte 2 represents facial information. Byte 3 represents body information. Byte 4 represents arm and leg type information, with the lower four bits representing the arm type and the upper four bits representing the leg type. The lower four bits of Byte 5 represent vocabulary, dialect and/or language abilities of the character. The upper four bits of Byte 5 represent Character personality/behavior information.

Preferably, geographic territories can use specific parts of the bytes for their own regional attribute variations. For example, bits 00*h* to 64*h* of the facial information byte can represent facial features with American/English characteristics. Similarly, bits 65*h* to C8*h* can represent facial features with Asian characteristics. As a result, a module distributed to an American/English user (or a user in a predominantly American/English geographic region) is preferably unable to generate oriental characters; however, modules can be configured to allow any type of character to be configured in any suitable region, if desired. Preferably, characters from other territories can still be seen, stored upon and pass through all modules, and only the character generator functionality does not give access to the library attributes specific to other territories. As a result, characters that cannot be generated in one territory may become valuable and/or sought after within that territory as rare, difficult to acquire characters.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A module comprising:
a processor;
a display operably coupled to said processor; and
a communication device operably coupled to said processor, wherein said processor is programmed to control a simulated character, wherein an image associated with the simulated character is displayable on said display, and wherein the image is displayable on a second display of a second module to simulate movement of the simulated character from a first virtual region associated with the module to a second virtual region associated with the second module, the first virtual region being different from the second virtual region, wherein the module is operable to communicate with the second module using said communication device and wherein the processor is programmed to display a first animation sequence if the module and the second module are arranged in a first physical configuration, the first animation sequence simulating movement of the simulated character from the first virtual region to the second virtual region, and wherein the processor is programmed to display a second animation sequence if the module and the second module are arranged in a second physical configuration, the second physical configuration being different from the first physical configuration, the second animation sequence simulating movement of the simulated character from the first virtual region to the second virtual region, and the first animation sequence being different from the second animation sequence.

2. The module of claim 1, wherein said display stops displaying the image if the image is displayed on the second display, and wherein the image is displayable on a third display of a third module to simulate movement of the simulated character to a third virtual region associated with the third module, wherein the third module is connected to the module indirectly via a connection path including the second module.

3. The module of claim 1, further comprising:
an orientation sensor operably coupled to said processor.

4. The module of claim 1, further comprising:
a sound sensor operably coupled to said processor.

5. The module of claim 1, further comprising:
a light sensor operably coupled to said processor.

6. The module of claim 1, further comprising:
a time device operably coupled to said processor.

7. A method of operating a module comprising:
simulating a character;
displaying a representation of the character on a display of the module;
enabling the module to operably connect with a second module;
simulating movement of the character from a first virtual region associated with the module to a second virtual region associated with the second module, the first virtual region not overlapping with the second virtual region, wherein simulating movement includes displaying the representation of the character on a second display of the second module, and wherein simulating movement includes not displaying the representation of the character on the display of the module if the representation of the character is displayed on the second display of the second module; and
simulating movement of the character to a third module, wherein the module, the second module and the third module can be interconnected simultaneously, wherein simulating movement of the character to the third module includes displaying the representation of the character on a third display of the third module, wherein the third module is connected to the module indirectly and enabling play of a game, wherein the game is at least partly conducted by connecting an additional module to an interconnected group of modules, wherein the interconnected group of modules includes the module, the second module, and the third module.

8. The method of claim 7, wherein simulating said character includes receiving input from an orientation sensor.

9. The method of claim 7, wherein simulating said character includes receiving input from a sound sensor.

10. The method of claim 7, wherein simulating said character includes receiving input from a light sensor.

11. The method of claim 7, wherein simulating said character includes receiving input from a time device.

12. A method of providing a simulated environment comprising:
providing a plurality of modules, wherein each of the plurality of modules includes a processor, a communications device operably coupled to the processor and a display device operably coupled to the processor, wherein a first of the plurality of modules is capable of being simultaneously connected with a second of the plurality of modules and a third of the plurality of modules, the second of the plurality of modules being associated with a first simulated character and the third of the plurality of modules being associated with a second simulated character, wherein connecting the first of the plurality of modules, the second of the plurality of modules and the third of the plurality of modules creates or modifies the simulated environment and enables displaying, on a display of the first of the plurality of modules, an interaction between the first simulated character and the second simulated character.

13. The method of claim 12, wherein each of said plurality of modules is associated with a simulated character.

14. The method of claim 12, wherein said plurality of modules are operable to affect play of a game.

15. The method of claim 14, wherein play of the game is at least partly conducted by connecting additional modules to an interconnected group of modules, wherein the interconnected group of modules includes the one of the plurality of modules and the at least two others of the plurality of modules.

16. The method of claim 12, wherein at least one of the three connected modules includes a orientation sensor operably coupled to the processor.

17. The method of claim 12, wherein at least one of the three connected modules includes a light sensor operably coupled to the processor.

18. A method of providing a simulated environment comprising:
providing a plurality of modules, wherein each of the plurality of modules includes a processor, a communications device operably coupled to the processor and a display device operably coupled to the processor, wherein at least one of the plurality of modules is capable of being connected with at least two others of the plurality of modules, wherein connecting the one of the plurality of modules and the at least two others of the plurality of modules creates or modifies the simulated environment,
wherein said plurality of modules are operable to affect play of a game,
wherein play of the game is at least partly conducted by connecting additional modules to an interconnected group of modules, wherein the interconnected group of modules includes the one of the plurality of modules and the at least two others of the plurality of modules.

19. The first module of claim 2, wherein the processor is further programmed to simulate movement of the simulated character through a fourth virtual region, the fourth virtual region not being displayed by any module, by causing the image to not be displayed for a period of time.

20. The module of claim 1, wherein, in the first physical configuration, the module is positioned above or below the second module, and wherein, in the second physical configuration, the module is positioned to the left or right of the second module.

21. The module of claim 1, wherein, in the first physical configuration, the module is positioned above the second module, and wherein, in the second physical configuration, the module is positioned below the second module.

22. The module of claim 1, wherein, in the first physical configuration, the module is positioned to the left of the second module, and wherein, in the second physical configuration, the module is positioned to the right of the second module.

23. The module of claim 1, wherein the module is approximately cube shaped.

24. The module of claim 1, wherein the communication device includes a connector on a surface of the module, the connector being operable to connect to a second connector of the second module.

25. A system comprising:
a first module, the first module including:
a first processor,
a first display operably coupled to the first processor, and
a first communication device operably coupled to the first processor; and
a second module, the second module including:
a second processor,
a second display operably coupled to the second processor, and
a second communication device operably coupled to the second processor,
wherein the first module and the second module are configurable in a first configuration and a second configuration, wherein the position of the first module relative to the position of the second module in the first configuration is different from the position of the first module relative to the position of the second module in the second configuration,
and wherein the first processor or the second processor is operable with the first display or the second display and the first communication device or the second communication device to
(i) display a first animation sequence of a simulated character if the first module and the second module are configured in the first configuration, and
(ii) display a second animation sequence of the simulated character if the first module and the second module are configured in the second configuration, the first animation sequence being different from the second animation sequence.

26. The system of claim 25, wherein the first animation sequence simulates the simulated character jumping or climbing from the first display to the second display.

27. The system of claim 25, wherein the first animation sequence simulates the simulated character digging from the first display to the second display.

28. The system of claim 25, wherein the first module and the second module are approximately cubical, the first module includes a first top connector located on a first top surface of the first module, a first left connector located on a first left surface of the first module, a first right connector located on a first right surface of the first module and a first bottom connector located on a first bottom surface of the first module, the second module includes a second top connector located on a second top surface of the second module, a second left connector located on a second left surface of the second module, a second right connector located on a second right surface of the second module and a second bottom connector located on a second bottom surface of the second module, and wherein the first right connector is connectable to the second left connector, the first left connector is connectable to the second right connector, the first top connector is connectable to the second bottom connector, and the first bottom connector is connectable to the second top connector.

29. A method of operating a module comprising: simulating a character; displaying a representation of the character on a display of the module; enabling the module to operably connect with a second module; simulating movement of the character from a first virtual region associated with the module to a second virtual region associated with the second module, the first virtual region not overlapping with the second virtual region, wherein simulating movement includes displaying the representation of the character on a second display of the second module, and wherein simulating movement includes not displaying the representation of the character on the display of the module if the representation of the character is displayed on the second display of the second module; simulating movement of the character to a third module, wherein the module, the second module and the third module can be interconnected simultaneously, wherein simulating movement of the character to the third module includes displaying the representation of the character on a third display of the third module, wherein the third module is connected to the module indirectly; displaying a first animation sequence if the module and the second module are arranged in a first physical configuration, the first animation sequence simulating movement of the character from the first virtual region to the second virtual region; and displaying a second animation sequence if the module and the second module are arranged in a second physical configuration, the second physical configuration being different from the first physical configuration, the second animation sequence simulating movement of the simulated character from the first virtual region to the second virtual region, and the first animation sequence being different from the second animation sequence.

30. A method of operating a module comprising: simulating a character; displaying a representation of the character on a display of the module; enabling the module to operably connect with a second module; simulating movement of the character from a first virtual region associated with the module to a second virtual region associated with the second module, the first virtual region not overlapping with the second virtual region, wherein simulating movement includes displaying the representation of the character on a second display of the second module, and wherein simulating movement includes not displaying the representation of the character on the representation of the character is displayed on the second display of the second module; simulating movement of the character to a third module, wherein the module, the second module and the third module can be interconnected simultaneously, wherein simulating movement of the character to the third module includes displaying the representation of the character on a third display of the third module, wherein the third module is connected to the module indirectly, wherein the module is associated with the character, the second module is associated with a second character, and the third module is associated with a third character.

* * * * *